(12) United States Patent
Hiramatsu

(10) Patent No.: US 9,832,635 B2
(45) Date of Patent: Nov. 28, 2017

(54) COMMUNICATION APPARATUS, CONTROL METHOD THEREOF, AND STORAGE MEDIUM

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 13/750,803

(22) Filed: Jan. 25, 2013

(65) Prior Publication Data

US 2013/0195090 A1 Aug. 1, 2013

(30) Foreign Application Priority Data

Jan. 30, 2012 (JP) ................................. 2012-017107

(51) Int. Cl.
*H04W 4/00* (2009.01)
*H04W 8/22* (2009.01)
*H04W 76/02* (2009.01)

(52) U.S. Cl.
CPC ............. *H04W 8/22* (2013.01); *H04W 76/02* (2013.01)

(58) Field of Classification Search
CPC .................................................. H04W 80/04
USPC ...................................................... 370/338
See application file for complete search history.

(56) References Cited

U.S. PATENT DOCUMENTS

| 2006/0039336 | A1* | 2/2006 | Ishimura | ........................ 370/338 |
| 2007/0223670 | A1* | 9/2007 | Ido | ............................ 379/201.01 |
| 2010/0095119 | A1* | 4/2010 | Tachibana | ............. H04W 12/04 713/168 |
| 2010/0217705 | A1* | 8/2010 | Tachibana | ............. G06Q 20/10 705/39 |
| 2010/0284296 | A1* | 11/2010 | Sakai | .................... H04W 8/245 370/252 |
| 2013/0337774 | A1* | 12/2013 | Johnson | ........................ 455/411 |

FOREIGN PATENT DOCUMENTS

| CN | 1738275 A | 2/2006 |
| JP | 2004-260401 A | 9/2004 |
| JP | 2006-60578 A | 3/2006 |
| JP | 2007-043598 A | 2/2007 |
| JP | 2010-245840 A | 10/2010 |

\* cited by examiner

*Primary Examiner* — Samina Choudhry
(74) *Attorney, Agent, or Firm* — Canon USA Inc., IP Division

(57) ABSTRACT

A communication apparatus includes a sharing unit configured to share a communication parameter for wireless communication with another communication apparatus with the another communication apparatus, a connection unit configured to connect to the another communication apparatus using the communication parameter shared by the sharing unit, a communication unit configured to, after connection with the another apparatus by the connection unit, communicate with the another communication apparatus by utilizing a predetermined function, and a control unit configured to control the communication parameter shared by the sharing unit according to a result of communication by the communication unit utilizing the predetermined function.

12 Claims, 10 Drawing Sheets

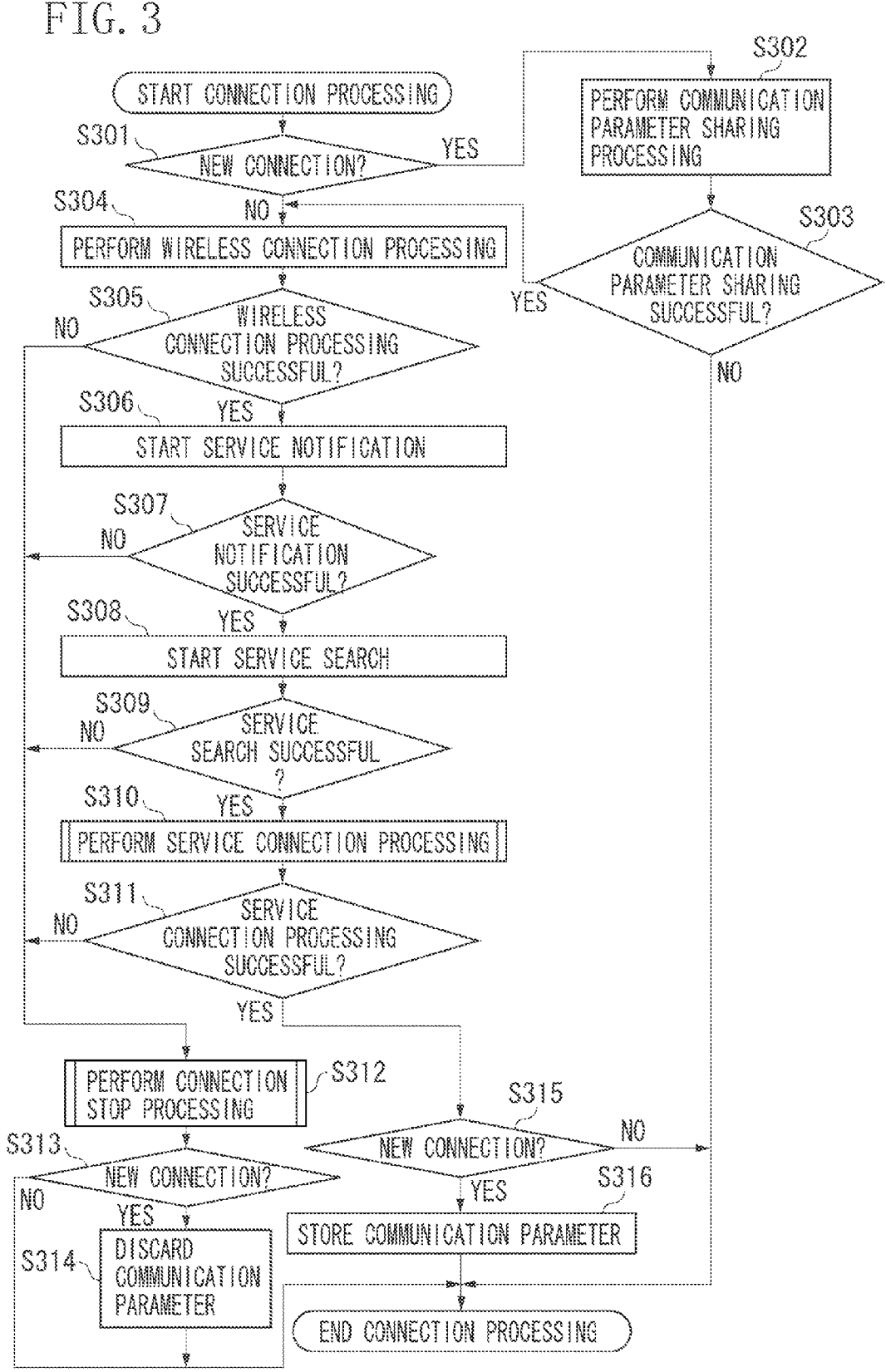

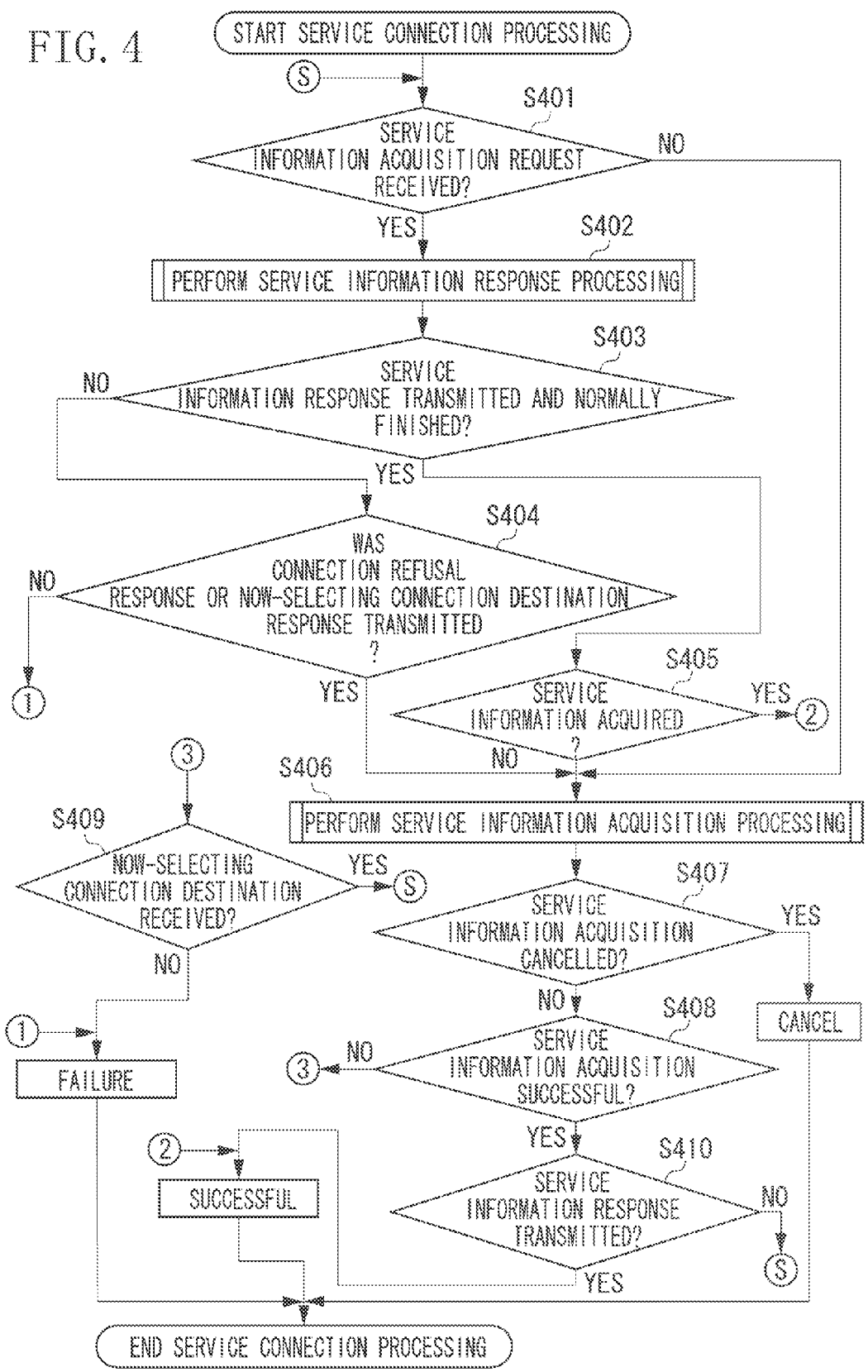

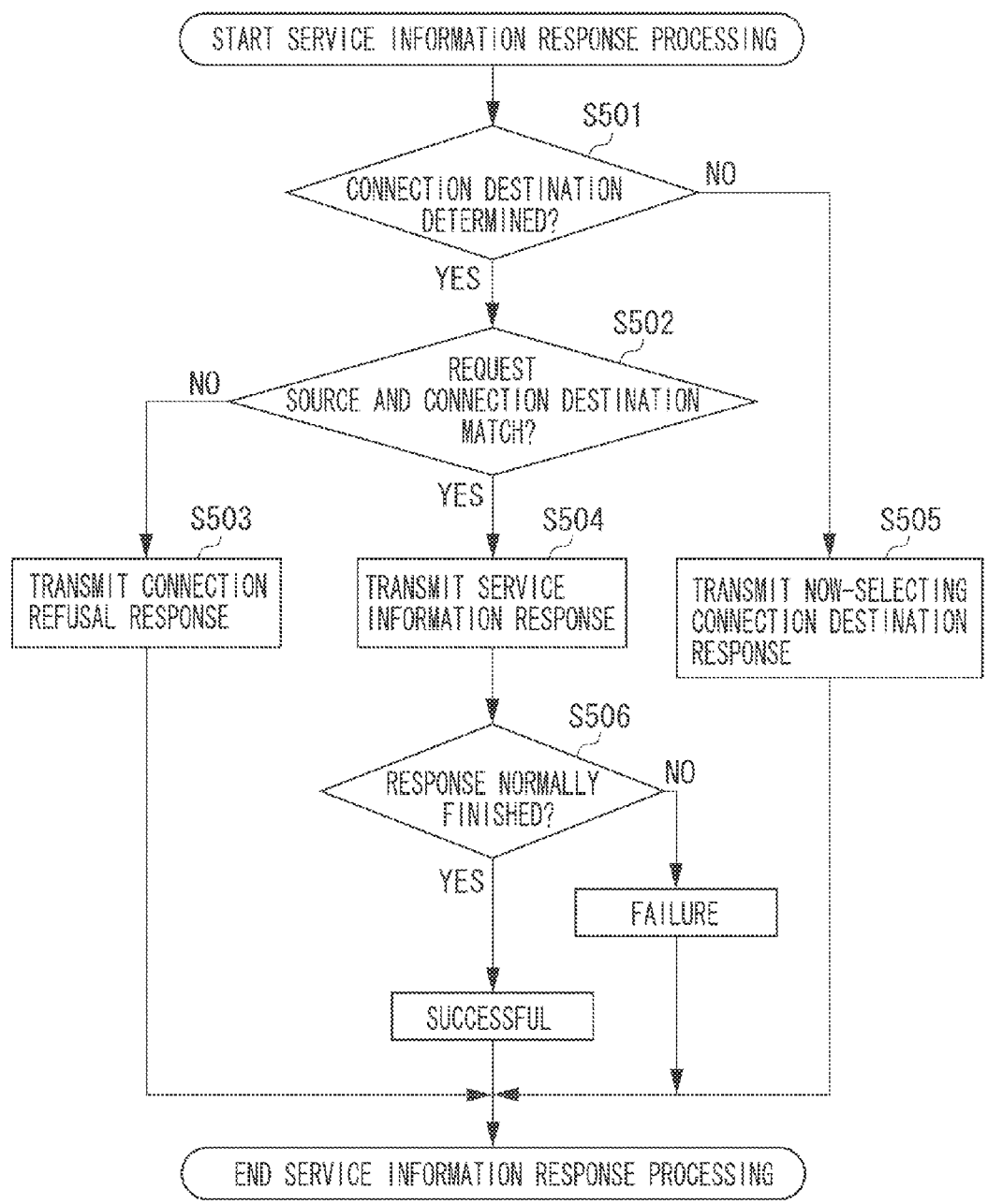

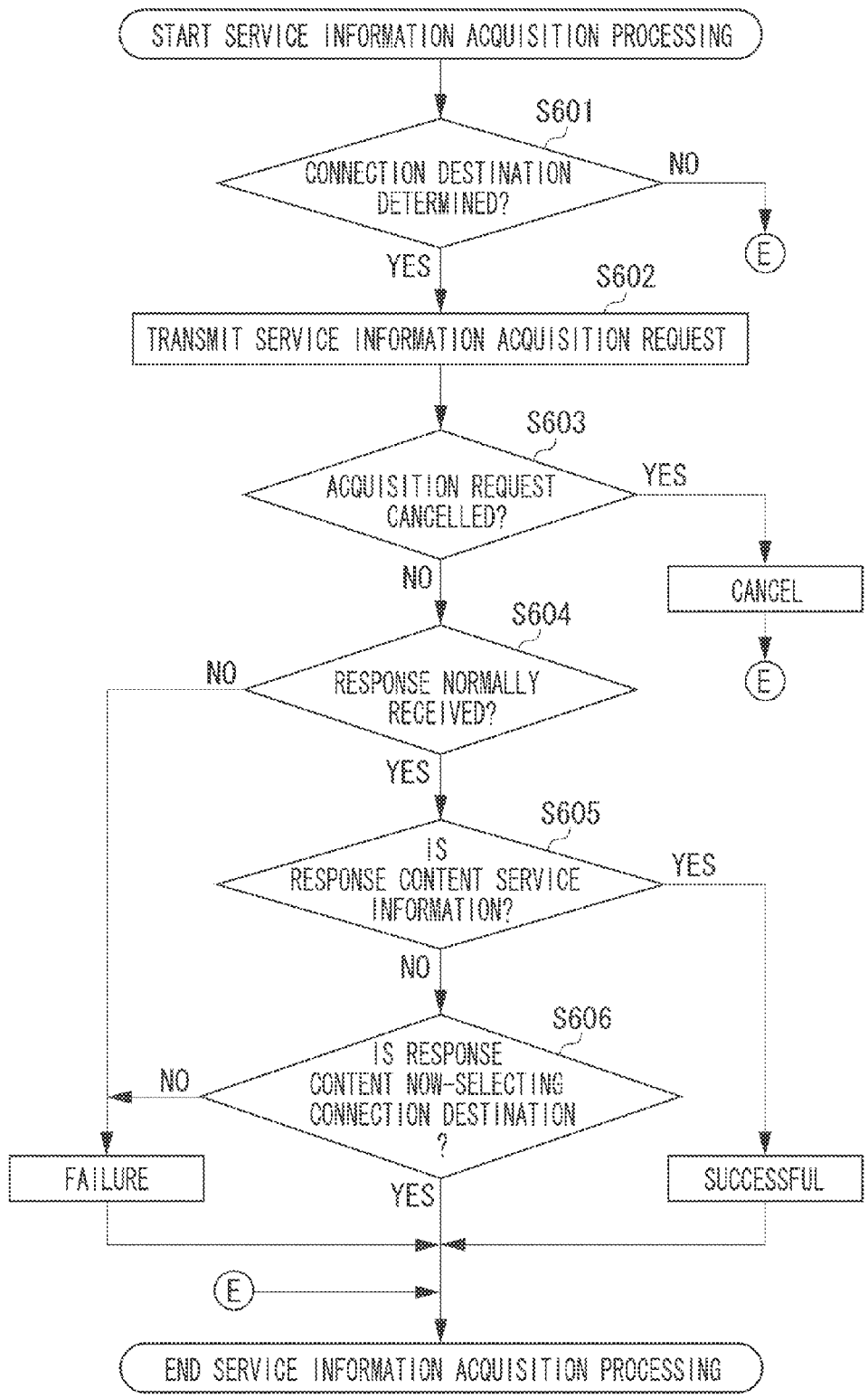

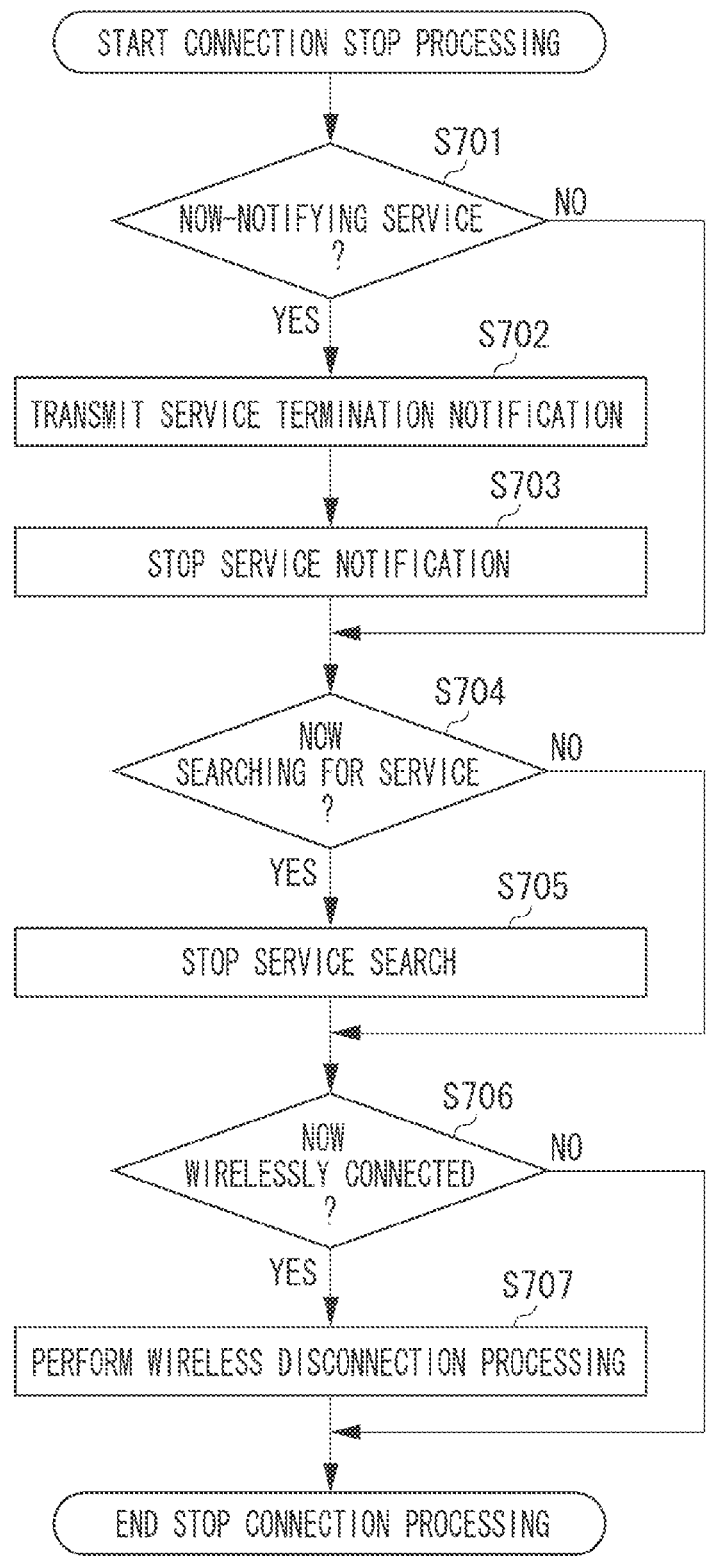

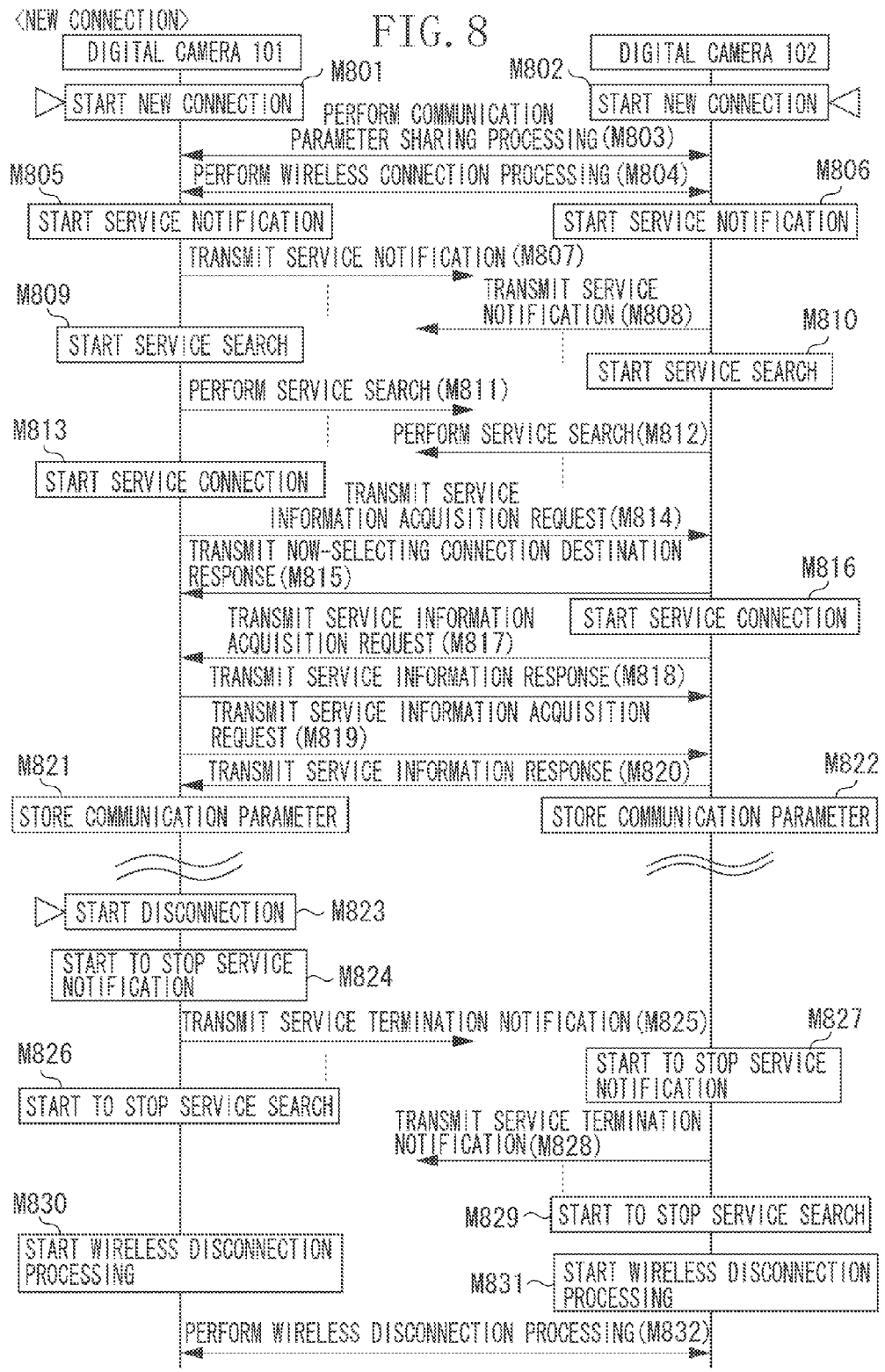

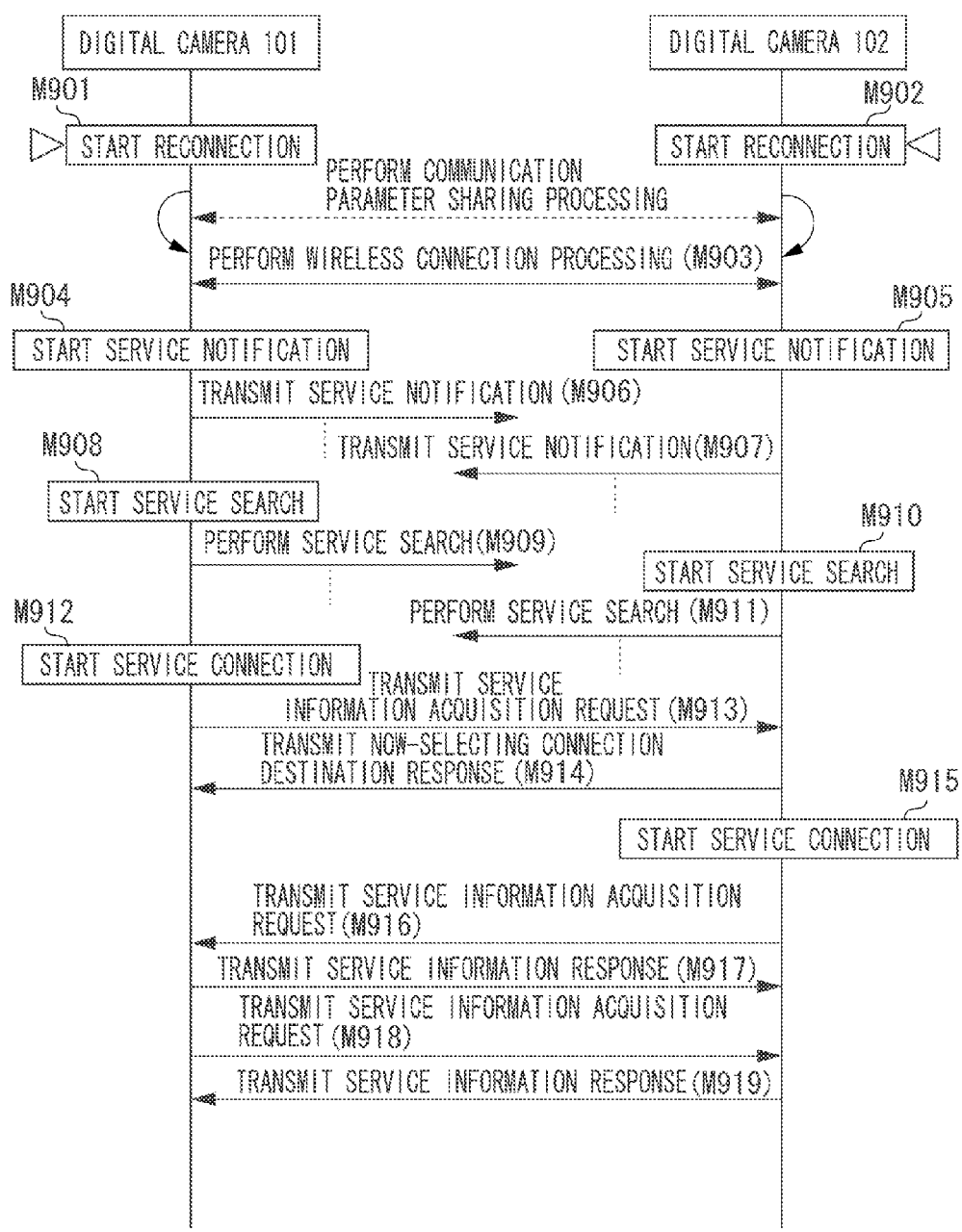

COMMUNICATION APPARATUS, CONTROL METHOD THEREOF, AND STORAGE MEDIUM

BACKGROUND OF THE INVENTION

Field of the Invention

The present invention relates to a communication apparatus capable of executing a predetermined service with another communication apparatus.

Description of the Related Art

Recently, systems that connect apparatuses utilizing wireless communication to provide various services have been developed. To connect such apparatuses utilizing wireless communication, it is necessary to commonly set communication parameters that are required for communication (service set identifier (SSID), encryption method, encryption key, authentication method, authentication key, address information etc.). However, it is troublesome for users to manually set the communication parameters.

Accordingly, an automatic setting method to automatically share and set a communication parameter has been realized. However, generally these settings take time. Consequently, Japanese Patent Application Laid-Open No. 2006-60578 (corresponding to US 2006/0039336 A1) discusses a method for shortening connection time by storing a communication parameter when connection was successful, and omitting setting processing when subsequently connecting with the same apparatus.

However, even if the apparatuses were successfully connected, there are cases in which a desired service with the other connected apparatus cannot be realized. For example, there are cases in which a desired service cannot be realized for a function that the other apparatus has, and cases in which acquisition of a function, which the other apparatus has, failed.

In such cases, a desired service that utilizes a function that the other apparatus has cannot be executed. Thus, even though the desired service cannot be executed, if a communication parameter of the other apparatus is stored for a long time, a storage area is wasted.

SUMMARY OF THE INVENTION

The present invention is directed to effectively utilizing a storage area.

According to an aspect of the present invention, a communication apparatus includes a sharing unit configured to share a communication parameter for wireless communication with another communication apparatus with the another communication apparatus, a connection unit configured to connect to the another communication apparatus using the communication parameter shared by the sharing unit, a communication unit configured to, after connection with the another apparatus by the connection unit, communicate with the another communication apparatus by utilizing a predetermined function, and a control unit configured to control to store the communication parameter shared by the sharing unit according to a result of communication by the communication unit utilizing the predetermined function.

According to an exemplary embodiment of the present invention, since a communication parameter that is not required to realize a predetermined service is discarded, a storage area can be effectively utilized.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating connection processing performed by digital cameras according to a first exemplary embodiment of the present invention.

FIG. 4 is a flowchart illustrating service connection processing performed by digital cameras according to the first exemplary embodiment.

FIG. 5 is a flowchart illustrating service information response processing performed by digital cameras according to the first exemplary embodiment.

FIG. 6 is a flowchart illustrating service information acquisition processing performed by digital cameras according to the first exemplary embodiment.

FIG. 7 is a flowchart illustrating connection stop processing performed by digital cameras according to the first exemplary embodiment.

FIG. 8 is a sequence diagram illustrating new connection according to the first exemplary embodiment.

FIG. 9 is a sequence diagram illustrating reconnection according to the first exemplary embodiment.

DESCRIPTION OF THE EMBODIMENTS

Various exemplary embodiments, features, and aspects of the invention will be described in detail below with reference to the drawings. However, the technical scope of the present invention is recited in the claims, and is not limited to the following exemplary embodiments.

Figure 1:
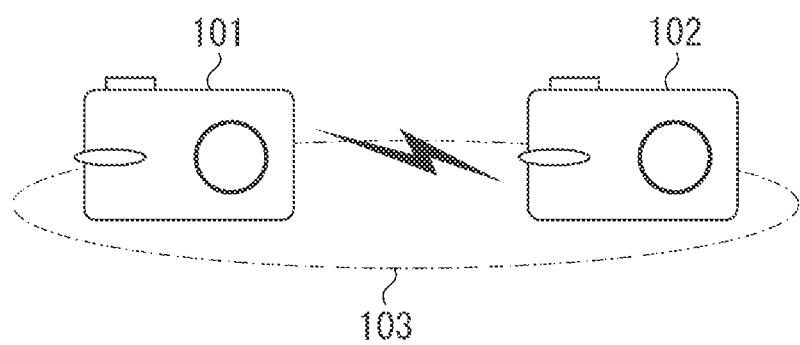
FIG. 1 illustrates a network configuration.

FIG. 1 is a network configuration diagram according to the present exemplary embodiment.

A wireless network 103 illustrated in FIG. 1 is configured from a digital camera 101 and a digital camera 102.

The digital camera 101 and the digital camera 102 according to the present exemplary embodiment have a wireless communication function. In the present exemplary embodiment, the wireless communication function will be described as a wireless local area network (LAN) function based on the Institute of Electrical and Electronics Engineers (IEEE) 802.11 series. However, the present exemplary embodiment is not limited to this. For example, wireless universal serial bus (USB), MultiBand OFDM Alliance (MBOA), Bluetooth®, ultra wide band (UWB), ZigBee and the like may also be used for the wireless communication function. Further, instead of a wireless communication function, a wired communication function, such as a wired LAN, may also be employed.

Figure 2A:
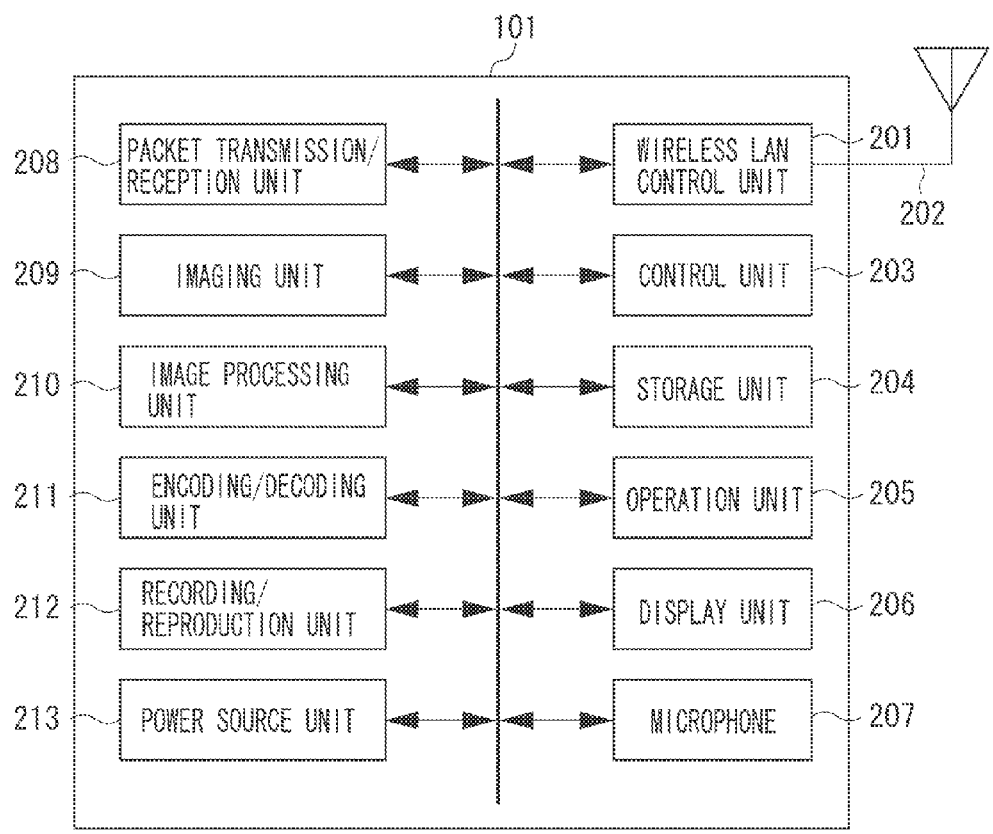
FIGS. 2A and 2B are block diagrams of a digital camera.

FIG. 2A is a block diagram illustrating a hardware configuration of the digital camera 101.

A wireless LAN control unit 201 performs wireless LAN radio frequency (RF) control, wireless LAN communication processing, and protocol processing related to drivers and wireless LAN communication that perform the various controls of the wireless LAN communication based on the IEEE 802.11 series.

An antenna 202 performs wireless LAN communication. A control unit 203 controls the whole digital camera 101 by executing control programs stored in a storage unit 204. The control unit 203 is configured from a central processing unit (CPU) or a micro-processing unit (MPU).

The storage unit 204 stores control programs executed by the control unit 203 and various information such as parameters required for communication. Various operations that are described below are executed by the control unit 203 executing a control program stored in the storage unit 204. Further, although the storage unit 204 is configured from a random access memory (RAM) and a read-only memory (ROM), the present exemplary embodiment is not limited to these. For example, the storage unit 204 may also be configured from a flexible disk, a hard disk, an optical disc, a magneto optical disk, a compact disc ROM (CD-ROM), a CD-recordable (CD-R), a magnetic tape, a non-volatile memory card, a ROM, a digital versatile disc (DVD) and the like.

An operation unit 205, which is configured from a button and the like, is for a user to operate the digital camera 101. A display unit 206, which is for displaying various types of information, includes a function capable of outputting information that can be visually perceived, such as a liquid crystal display (LCD) or a light-emitting diode (LED), or of outputting sound, such as a speaker.

The hardware configuration illustrated FIG. 2A also includes a microphone 207. A packet transmission/reception unit 208 transmits and receives packets relating to various types of communication. An imaging unit 209 captures optical images of a subject. An image processing unit 210 performs various processes, such as converting a captured image output from the imaging unit 209 into image data in a predetermined format, and performing luminance and color correction of the image data.

An encoding/decoding unit 211 performs predetermined high efficiency coding (e.g., a direct cosine transform (DCT) conversion, and variable-length coding after quantization) on the image data output from the image processing unit 210. A recording/reproduction unit 212 records and reproduces the image data subjected to compression coding on a recording medium (not illustrated). A power source unit 213 supplies power to the digital camera 101.

Since a configuration of function blocks relating to the digital camera 102 according to the present exemplary embodiment can be realized by the same configuration as for the digital camera 101, a description thereof is omitted here.

Figure 2B:
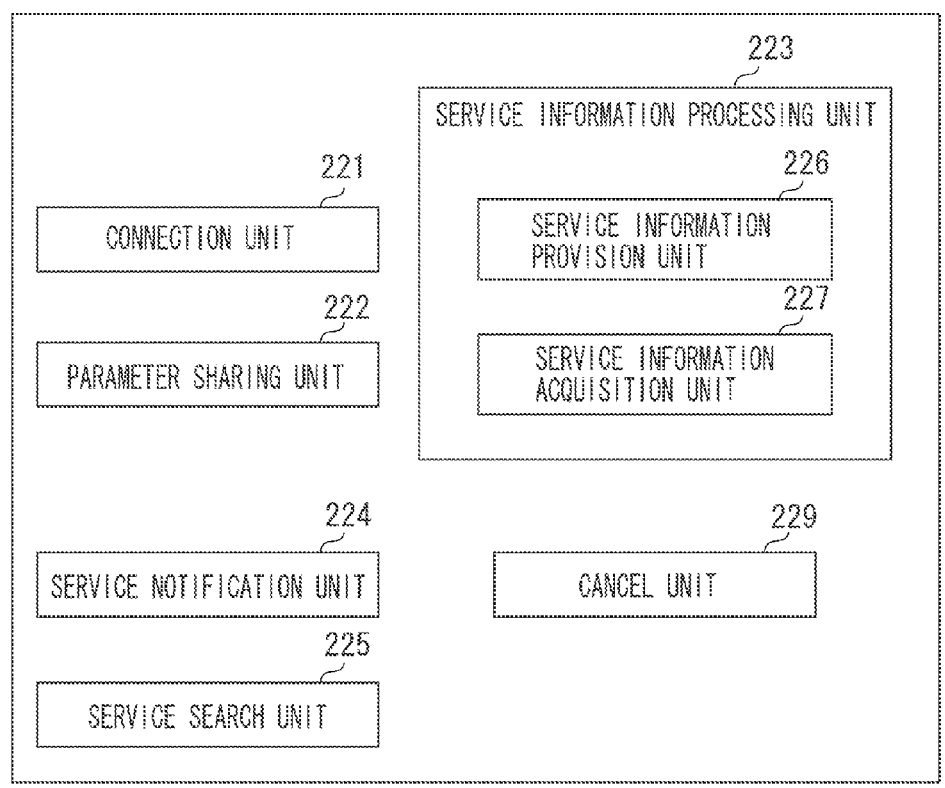

FIG. 2B is a block diagram illustrating a software configuration of the digital camera 101. Each block is a software block executed by the control unit 203 executing a program stored in the storage unit 204.

A connection unit 221 performs wireless connection processing between the digital camera 101 and the digital camera 102 by utilizing the wireless LAN control unit 201 and the packet transmission/reception unit 208. A parameter sharing unit 222 shares a communication parameter that is required to perform the wireless connection between the digital camera 101 and the digital camera 102.

A service notification unit 224 notifies the digital camera 102 of function information (hereinafter, referred to as a service type) that the digital camera 101 has by utilizing the wireless LAN control unit 201 and the packet transmission/reception unit 208.

A service search unit 225 searches the service type that the digital camera 102 has by utilizing the wireless LAN control unit 201 and the packet transmission/reception unit 208.

A service information processing unit 223 provides and receives service information required to perform a specific service (e.g., a transmission and reception service of images and moving images, a digital camera remote operation service etc.). For this purpose, the service information processing unit 223 also includes a service information provision unit 226 that provides service information about the digital camera 101 to the digital camera 102, and a service information acquisition unit 227 for acquiring service information about the digital camera 102.

A cancel unit 229 cancels a connection between the digital camera 101 and the digital camera 102.

All of the above-described function blocks are interrelated based on software or hardware. Further, these function blocks are just an example. A plurality of function blocks may form one function block, or any of the function blocks may be divided into blocks that further perform a plurality of functions.

In the present exemplary embodiment, when the digital camera 101 and the digital camera 102 start connection processing, the wireless communication function is firstly operated to share a communication parameter.

Next, when the digital camera 101 and the digital camera 102 complete the sharing of the communication parameter, service search processing starts by using the shared communication parameters to join the wireless LAN network.

When the digital camera 101 and the digital camera 102 find a predetermined service, both the service information is acquired by the both cameras. If both the digital camera 101 and the digital camera 102 successfully acquired and responded to the respective service information, the digital camera 101 and the digital camera 102 store the communication parameter and end the connection processing. If the digital camera 101 and the digital camera 102 failed to successfully acquire and respond to the service information, they discard the communication parameter and end the connection processing.

Then, during reconnection, the digital camera 101 and the digital camera 102 skip the communication parameter sharing processing by each performing connection processing using the stored communication parameter.

FIG. 3 is a flowchart that is realized by the control unit 203 reading a program stored in the storage unit 204 when performing connection processing between the digital camera 101 and the digital camera 102.

This connection processing is performed, for example, when the digital camera 101 power has been turned on, when an operation is made on the operation unit 205 by the user, and when a predetermined signal is received from an external device.

In step S301, the connection unit 221 determines whether connection processing is a new connection. The determination regarding whether connection processing is a new connection is performed based on an instruction from the user via the operation unit 205. However, this determination may also be performed based on whether a communication parameter for communicating with the digital camera 102 or the service information about the digital camera 102 is stored in the storage unit 204.

Examples of this communication parameter may include, but are not limited to, the SSID, the encryption method, the encryption key, the authentication method, the authentication key, Internet protocol (IP) address information (IP address, subnet mask, gateway address etc.).

If it is determined that the connection processing is a new connection (YES in step S301), the processing proceeds to step S302. If it is determined that the connection processing is not a new connection (NO in step S301), the processing proceeds to step S304.

In step S302, the parameter sharing unit 222 performs communication parameter sharing processing with the digital camera 102. In this step, the parameter sharing unit 222 shares a communication parameter by utilizing an automatic communication parameter setting method, such as Wi-Fi protected setup (WPS).

Further, the IP address information is acquired utilizing Auto-IP or dynamic host configuration protocol (DHCP). However, the present exemplary embodiment is not limited to this. For example, the communication parameter sharing processing can also be performed by acquiring a communication parameter from the external device utilizing a wired or wireless method (near field communication (NFC) etc.). The shared communication parameter is temporarily stored in the storage unit 204.

In step S303, the parameter sharing unit 222 determines whether the communication parameter sharing processing was successful. If it is determined that the sharing processing was successful (YES in step S303), the processing proceeds to step S304. If it is determined that the sharing processing was not successful (failed) (NO in step S303), the parameter sharing unit 222 notifies the user of an error, and ends the connection processing.

The failure of the sharing processing can be caused by, for example, a session overlap error in WPS, a poor radio wave environment, or an error occurring in the packets communicating in the communication parameter sharing processing.

In step S304, the connection unit 221 performs the wireless connection processing with the digital camera 102 utilizing the shared communication parameter. In step S305, the connection unit 221 determines whether the wireless connection processing was successful. If it is determined that the wireless connection processing was successful (YES in step S305), the processing proceeds to step S306. If it is determined that the wireless connection processing was not successful (NO in step S305), the processing proceeds to step S312.

In step S306, the service notification unit 224 starts notification of the service type provided by the digital camera 101. Examples of this service type include a friendly name of the digital camera 101, the name of its manufacturer, the product model name, a universally unique identifier (UUID), a service kind, a service ID, a uniform resource locator (URL) for acquisition of the service information, a URL for service execution, version information and the like. The service kind is information that the service is a camera service for connecting to a mobile device, or a mobile device service for connecting to a camera.

In step S307, the service notification unit 224 determines whether notification of the service type was successful. Failure of notification of the service type may occur, for example, when multicast transmission of the service type cannot be performed due to a network setting. If it is determined that notification of the service type was successful (YES in step S307), the processing proceeds to step S308. If it is determined that notification of the service type was not successful (NO in step S307), the processing proceeds to step S312.

In step S308, the service search unit 225 starts a service search. The service search is performed by determining whether the service kind notified by an apparatus in the network matches a predetermined service kind.

In step S309, the service search unit 225 determines whether the service search was successful. If it is determined that the service search was successful (YES in step S309) (i.e., a predetermined service type was detected), the processing proceeds to step S310. If it is determined that the service search was not successful (NO in step S309) (i.e., a predetermined service type was not detected), the processing proceeds to step S312.

In step S310, service connection processing is performed. This service connection processing will be described with reference to FIG. 4.

In step S401, the service information provision unit 226 determines whether an acquisition request for the service information has been received from the digital camera 102. If it is determined that such an acquisition request has been received (YES in step S401), the processing proceeds to step S402. If it is determined that such an acquisition request has not been received (NO in step S401), the processing proceeds to step S406. Examples of the service information include the name of a service provided by the digital camera 101, the name of an executable action, a processing classification of the action (a service kind), an argument group for execution of the action, and the like.

The service information response processing performed in step S402 will be described with reference to FIG. 5.

In step S501, the connection unit 221 determines whether a connection destination for executing a predetermined service has been established.

Specifically, if, based on the service search, it is determined that there is one apparatus providing a predetermined service, that apparatus is established as the connection destination. Further, if there is a plurality of apparatuses providing the predetermined service, the friendly names of the plurality of apparatuses are displayed, and the connection destination is established based on execution of an operation, such as a button operation by the user.

If it is determined that the connection destination has been established (YES in step S501), the processing proceeds to step S502. If it is determined that the connection destination has not been established (NO in step S501), the processing proceeds to step S505. In step S505, the service information provision unit 226 transmits a now-selecting connection destination response, and then ends the service information response processing.

In step S502, it is determined whether the request source of the received service information acquisition request matches the established connection destination.

If it is determined that the request source does not match the established connection destination (NO in step S502), the processing proceeds to step S503. In step S503, the service information provision unit 226 transmits a connection refusal response, and then ends the service information response processing. On the other hand, if it is determined that the request source does match the established connection destination (YES in step S502), the processing proceeds to step S504. In step S504, the service information provision unit 226 transmits a service information response, and the processing then proceeds to step S506.

The verification of whether the connection destination and the request source match is performed using a UUID. However, the present exemplary embodiment is not limited to this. For example, some other identifiers may be used, such as an IP address or a friendly name.

In step S506, the service information provision unit 226 determines whether the service information response was normally finished. If it is determined that the service information response was normally finished (YES in step S506), the service information provision unit 226 determines that service information response processing was successful, and ends the processing. Examples of cases in which the service information response was not normally finished include when response transmission times out.

In step S403, the service information provision unit 226 determines whether the service information response was transmitted and whether that the service information response was successful or normally finished (i.e., YES in step S506). If it is determined that the service information response was successful (YES in step S403), the processing proceeds to step S405. If it is determined that the service information response was not successful (NO in step S403), the processing proceeds to step S404.

In step S404, the service information provision unit 226 determines whether a connection refusal response or a now-selecting connection destination response was transmitted. If it is determined that either of these responses was transmitted (YES in step S404), the processing proceeds to step S406. If it is determined that neither of these responses was transmitted (i.e., NO in step S506) (NO in step S404), the service information provision unit 226 determines that the service connection processing failed, and ends the service connection processing.

In step S405, the service information acquisition unit 227 determines whether the service information has already been acquired. If it is determined that service information has already been acquired (YES in step S405), the service information acquisition unit 227 determines that the service connection processing was successful, and ends the service connection processing. On the other hand, if it is determined that service information has not been acquired (NO in step S405), the processing proceeds to step S406.

The service information acquisition processing performed in step S406 will be described with reference to FIG. 6.

In step S601, the connection unit 221 determines whether the connection destination for executing a predetermined service has been established. If it is determined that the connection destination has been established (YES in step S601), the processing proceeds to step S602. In step S602, the service information acquisition unit 227 transmits a service information acquisition request, and the processing then proceeds to step S603. If it is determined that the connection destination has not been established (NO in step S601), the service information acquisition unit 227 ends the service information acquisition processing.

In step S603, the cancel unit 229 determines whether the service information acquisition request has been cancelled. Cancellation is performed based on an operation such as turning the power off or the user pressing a button being executed.

If it is determined that the service information acquisition request has been cancelled (YES in step S603), the cancel unit 229 ends the processing. If it is determined that the service information acquisition request has not been cancelled (NO in step S603), the processing proceeds to step S604. Consequently, cancel processing from the user can be received while waiting for the response to the service information acquisition request.

In step S604, the service information acquisition unit 227 determines whether a response to the service information acquisition request has been normally received. If it is determined that the response has been normally received (YES in step S604), the processing proceeds to step S605. If it is determined that the response has not been normally received (NO in step S604), the service information acquisition unit 227 determines that the service information acquisition processing failed, and ends the processing. Examples of cases in which the response is not normally received include when transmission of the request times out, or when reception of the response to the request times out.

In step S605, the service information acquisition unit 227 determines whether the content of the response to the acquisition request is the service information. If it is determined that this response is the service information (YES in step S605), the service information acquisition unit 227 determines that the service information acquisition processing was successful, and ends the service information acquisition processing. If it is determined that the response is not the service information (NO in step S605), the processing proceeds to step S606.

In step S606, the service information acquisition unit 227 determines whether the content of the response to the service information acquisition request is a now-selecting connection destination. If it is determined that the response is the now-selecting connection destination (YES in step S606), the service information acquisition unit 227 ends the service information acquisition processing. If it is determined that the response is not the now-selecting connection destination (NO in step S606), the service information acquisition unit 227 determines that the service information acquisition processing failed, and ends the processing.

We will now return to the description of FIG. 4. In step S407, the cancel unit 229 determines whether the service information acquisition processing has been cancelled. If it is determined that the service information acquisition processing has been cancelled (YES in step S407), the cancel unit 229 determines that the service connection processing has been cancelled, and ends the service connection processing. If it is determined that the service information acquisition processing has not been cancelled (NO in step S407), the processing proceeds to step S408.

In step S408, the service information acquisition unit 227 determines whether service information acquisition was successful. If it is determined that the service information acquisition was successful (YES in step S408), the processing proceeds to step S410. If it is determined that the service information acquisition was not successful (NO in step S408), the processing proceeds to step S409.

In step S409, the service information acquisition unit 227 determines whether the content of the response to the service information acquisition request is the now-selecting connection destination. If it is determined that the response is the now-selecting connection destination (YES in step S409), the processing returns to step S401. If it is determined that the response is not the now-selecting connection destination (NO in step S409) (i.e., when the response to the service information acquisition was not normally received or when the content of the response was a connection refusal response), the service information acquisition unit 227 determines that the service connection processing failed, and ends the processing.

In step S410, the service information provision unit 226 determines whether a response to the service information has already been transmitted. If it is determined that a response has been transmitted (YES in step S410), the service information provision unit 226 determines that the service connection processing was successful, and ends the processing. If it is determined that a response has not been transmitted (NO in step S410), the processing returns to step S401.

In the present exemplary embodiment, the service information acquisition request and the response are respectively performed by using a GET method of a hypertext transfer protocol (HTTP), and a status code and body portion of an HTTP response thereto. However, the present exemplary embodiment is not limited to this. For example, the service information acquisition request and the response can be performed directly based on a transmission control protocol (TCP) and a user datagram protocol (UDP).

In step S311, the service information processing unit 223 determines whether the service connection processing illustrated in FIG. 4 successfully ended. If it is determined that the processing successfully ended (YES in step S311), the processing proceeds to step S315. If it is determined that the processing did not successfully end (NO in step S311), the processing proceeds to step S312.

In step S312, connection stop processing illustrated in FIG. 7 is performed. The connection stop processing will be described with reference to FIG. 7.

In step S701, the service notification unit 224 determines whether the digital camera 101 service type is now being notified. If it is determined that the service type is now being notified (YES in step S701), the processing proceeds to step S702. If it is determined that the service type is not now being notified, the processing proceeds to step S704.

In step S702, the service notification unit 224 transmits a service termination notification. the service termination notification notifies that service provision by the digital camera 101 will end by transmitting a service notification in which a service effective period is set as zero. Then, in step S703, the service notification unit 224 stops notification of the service type.

In step S704, the service search unit 225 determines whether a service is now being searched for. If it is determined that a service is now being searched for (YES in step S704), the processing proceeds to step S705. In step S705, the service search unit 225 stops the service search.

In step S706, the connection unit 221 determines whether the camera is now wirelessly connected. If it is determined that the camera is now wirelessly connected (YES in step S706), the processing proceeds to step S707. In step S707, the connection unit 221 performs wireless disconnection processing.

When the connection stop processing is completed, in step S313, the connection unit 221 determines whether the destination connected in step S304 is a new connection destination. If it is determined that this destination is a new connection destination (YES in step S313), the processing proceeds to step S314. In step S314, the parameter sharing unit 222 discards the communication parameter, and then ends the connection processing.

If it is determined that this destination is not a new connection destination (NO in step S313), the connection unit 221 ends the connection processing without discarding the communication parameter. In the processing, if it is determined that the destination is a new connection destination, all communication parameters are discarded, and then the connection processing is finished.

However, the present exemplary embodiment is not limited to this. The processing can be performed so that some of the communication parameters are not discarded. For example, in a case in which the wireless connection processing was successful, but there was subsequently a failure in the service notification, the search or the service connection processing, the wireless LAN connection parameter may be stored without being discarded.

Further, although the connection processing was finished without discarding a communication parameter when the connection was not a new connection destination, the connection processing using a stored communication parameter may also be configured so that if the processing consecutively fails a predetermined number of times or more, the stored communication parameter is discarded.

In such a case, if a communication parameter was input by the user operating the operation unit 205, then that communication parameter is not discarded. Consequently, the processing can be performed so that the communication parameter that the user went to all the trouble of inputting is not arbitrarily deleted.

A case in which the service connection processing was determined in step S311 to have been successful will now be described. In step S315, the connection unit 221 determines whether the destination connected in step S304 is a new connection destination.

If it is determined that this destination is a new connection destination (YES in step S315), the processing proceeds to step S316. In step S316, the parameter sharing unit 222 stores the communication parameter in the storage unit 204. In this case, the parameter sharing unit 222 stores the communication parameter by associating it with the connection destination.

On the other hand, if it is determined that this destination is not a new connection destination (NO in step S315), the communication parameter is not stored. This is because the communication parameter associated with the connection destination is already stored in the storage unit 204. However, for example, if the communication parameter is different from the communication parameter stored in the storage unit 204, such as when the address information has been newly updated, the communication parameter may be newly stored in the storage unit 204.

Connection sequences between the digital camera 101 and the digital camera 102 based on the configuration illustrated in FIGS. 1 to 7 will now be described using FIGS. 8 and 9.

First, the communication sequence performed for anew connection (i.e., when the digital camera 101 does not store the communication parameter of the digital camera 102) will be described with reference to FIG. 8.

In sequences M801 and M802, the user performs an operation to start a new connection for both the digital camera 101 and the digital camera 102. After this operation is performed, in sequence M803, the digital camera 101 and the digital camera 102 each perform communication parameter sharing processing. Then, in sequence M804, the digital camera 101 and the digital camera 102 perform wireless connection processing using the shared communication parameter.

After the wireless connection processing is completed, in sequences M805 and M806, the digital camera 101 and the digital camera 102 start a service notification, respectively. Following this operation, in sequences M807 and M808, a service notification message is periodically transmitted.

In sequences M809 and M810, the digital camera 101 and the digital camera 102 start a service search. Following this operation, in sequences M811 and M812, a service notification request is periodically transmitted.

In sequence M813, when the digital camera 101 finds a service of the digital camera 102, the digital camera 101 starts service connection processing. In sequence M814, the digital camera 101 transmits a service information acquisition request to the digital camera 102.

In sequence M815, when the digital camera 102 receives the service information acquisition request, since a connection is not yet established at this point, the digital camera 102 transmits a response notifying that the digital camera 102 is now selecting a connection destination.

In sequence M816, when the digital camera 102 finds a service of the digital camera 101, the digital camera 102 starts service connection processing. In sequence M817, the digital camera 102 transmits a service information acquisition request to the digital camera 101.

In sequence M818, when the digital camera 101 receives the service information acquisition request, since the established connection destination and the request source match, the digital camera 101 transmits a service information response. In sequence M819, the digital camera 101 again transmits a service information acquisition request to the digital camera 102.

In sequence M820, when the digital camera 102 receives the service information acquisition request, since the established connection destination and the request source match, the digital camera 102 transmits a service information response.

When the service information acquisition and the response have been completed by both the digital camera 101 and the digital camera 102, each of the digital camera 102 and the digital camera 101 considers the service connection to have been successful, and stores the communication parameter by associating with the friendly name thereof.

In sequence M823, when service execution is completed between the digital camera 101 and the digital camera 102, the user performs an operation on the digital camera 101 to start a disconnection.

In sequence M824, when this operation has been performed, the digital camera 101 starts to stop the service notification. In sequence M825, the digital camera 101 transmits a service termination notification message. In sequence M826, when the stopping of the service notification is completed, the digital camera 101 starts to stop the service search.

In sequence M827, when the digital camera 102 receives the service termination notification message from the digital camera 101, the digital camera 102 starts to stop the service notification. In sequence M828, the digital camera 102 transmits a service termination notification message. In sequence M829, when the stopping of the service notification is completed, the digital camera 102 starts to stop the service search. In sequences M830 and M831, the digital camera 101 and the digital camera 102 both start wireless disconnection processing, and then in sequence M832, execute wireless disconnection processing.

Next, a communication sequence performed for a reconnection (i.e., when the digital camera 101 does store the communication parameter of the digital camera 102) will be described with reference to FIG. 9.

In sequences M901 and M902, the user performs an operation to start a reconnection for both the digital camera 101 and the digital camera 102. Examples of the operation to start a reconnection include, but are not limited to, the user selecting a stored friendly name as the connection destination.

After this operation is performed, in sequence M903, the digital camera 101 and the digital camera 102 perform wireless connection processing using the communication parameter stored when performing the new connection processing, without performing communication parameter sharing processing.

Then, in sequences M904 to M919, i.e., from the service notification processing to the service information response, the same processing as that performed during the new connection communication sequence in sequences M805 to M820 (illustrated in FIG. 8) is performed. Accordingly, a description thereof will be omitted here.

When the service information acquisition and the response have been completed by both the digital camera 101 and the digital camera 102, each of the digital camera 101 and the digital camera 102 considers the service connection to have been successful, and ends the reconnection processing without storing the communication parameter.

Although the present exemplary embodiment is described based on the assumption that the service notification and the service search are performed using a known protocol, such as universal plug and play (UPnP) and multicast domain name system (mDNS), the present exemplary embodiment is not limited to this.

In the present exemplary embodiment, although the digital camera 101 is the first to find the digital camera 102 service and start service connection, the present exemplary embodiment is not limited to this. For example, the digital camera 102 can be the first to find the digital camera 101 service and start service connection.

In the present exemplary embodiment, although the start of disconnection is performed based on the user operation on the digital camera 101, the start of disconnection can be triggered at some other timing. For example, completion of a specific service execution may act as a trigger. Further, disconnection may not always be started at the digital camera 101, but disconnection can start from the digital camera 102.

In the present exemplary embodiment, although the communication parameter is stored immediately after completion of the service connection processing, the present exemplary embodiment is not limited to this. For example, the communication parameter may be stored after completion of service execution, or after completion of disconnection processing.

In the present exemplary embodiment, although only a communication parameter is stored when service information acquisition and response were successful, the acquired service information may also be stored. In this case, during the reconnection, in addition to the communication parameter sharing processing, the service information acquisition request can also be omitted.

Further, in the present exemplary embodiment, discarding of the communication parameter indicates that the communication parameter temporarily shared and stored in the storage unit 204 in step S302 illustrated in FIG. 3 is deleted from the storage unit 204. However, the present exemplary embodiment is not limited to this. For example, the communication parameter temporarily shared in step S302 and stored in the storage unit 204 may be marked with a deletion flag. The storage unit 204 can be effectively utilized by overwriting a communication parameter marked with a deletion flag the next time another communication parameter is acquired.

Thus, the time taken for the connection processing that is required to execute a service between apparatuses can be shortened without storing a communication parameter of an apparatus that does not perform a predetermined service.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments.

For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-017107 filed Jan. 30, 2012, which is hereby incorporated by reference herein in its entirety.

What is claimed is:

1. A communication apparatus comprising:
a receiver configured to receive, from another communication apparatus, service type information indicating a type of service that is executable between the communication apparatus and the another communication apparatus after communication has been established;
at least one processor and a memory storing instructions, that when executed by the at least one processor controls the at least one processor to perform operations comprising:
obtaining a communication parameter for communication with the another communication apparatus;
establishing communication between the communication apparatus and the another communication apparatus using the communication parameter;
searching for the service type information via the communication established based on the obtained communication parameter, wherein the receiver is configured to receive the service type information from the another communication apparatus based on the searching; and
discarding the obtained communication parameter in response to a failure of the search to locate the service type information,
wherein the communication parameter includes identification information of a wireless network, and an encryption method and an authentication method that are used for the wireless network.

2. The communication apparatus according to claim 1, wherein the obtained communication parameter is discarded in a case where the service type information is received by the receiver but does not include a predetermined type of service.

3. The communication apparatus according to claim 1, wherein the communication apparatus transmits, to the another communication apparatus, function type information indicating a function of the communication apparatus, and
discards the obtained communication parameter in a case where a failure to transmit the function type information is detected.

4. The communication apparatus according to claim 1, wherein the communication apparatus obtains a type of the another communication apparatus from the another communication apparatus, and
discards the obtained communication parameter in a case where the obtained type of the another communication apparatus is not a predetermined type.

5. The communication apparatus according to claim 4, wherein the receiver receives the service type information in a case where the type of the another communication apparatus is the predetermined type.

6. The communication apparatus according to claim 1, wherein the communication apparatus issues a request for the service type information to the another communication apparatus, and
wherein the receiver receives the service type information from the another communication apparatus as a response to the issued request.

7. The communication apparatus according to claim 1, wherein the service type information includes at least one of a name of a service, a type of a service, a command for causing the another communication apparatus to execute the service, a name of a function, a type of the function, and a command for causing the another communication apparatus to execute the function.

8. A method for controlling a communication apparatus, the method comprising:
obtaining a communication parameter for establishing communication with another communication apparatus;
establishing communication between the communication apparatus and the another communication apparatus using the communication parameter,
searching for the service type information via the communication established based on the obtained communication parameter, wherein the communication apparatus is configured to receive the service type information from the another communication apparatus based on the searching; and
discarding the obtained communication parameter in response to a failure of the search to locate the service type information,
wherein the communication parameter includes identification information of a wireless network, and an encryption method and an authentication method that are used for the wireless network.

9. A non-transitory computer-readable storage medium storing instructions that, when executed by a processor, execute a control method for controlling a communication apparatus, the control method comprising:
obtaining a communication parameter for establishing communication with another communication apparatus;
establishing communication between the communication apparatus and the another communication apparatus using the communication parameter,
searching for the service type information via the communication established based on the obtained communication parameter, wherein the communication apparatus is configured to receive the service type information from the another communication apparatus based on the searching; and
discarding the obtained communication parameter in response to a failure of the search to locate the service type information,
wherein the communication parameter includes identification information of a wireless network, and an encryption method and an authentication method that are used for the wireless network.

10. The communication apparatus according to claim 1, wherein the service type information includes an identifier usable by the communication apparatus to execute the service with the another communication apparatus.

11. The communication apparatus according to claim 1, wherein the service type information includes an identifier enabling execution of the service between the communication apparatus and the another communication apparatus.

12. The communication apparatus according to claim 1, wherein the service type information describes a function being performed between the communication apparatus and the another communication apparatus and an identifier including information enabling the communication apparatus to execute the service type between the communication apparatus and the another communication apparatus.

* * * * *